US011970883B2

(12) United States Patent
Zamansky et al.

(10) Patent No.: US 11,970,883 B2
(45) Date of Patent: Apr. 30, 2024

(54) TAMPER PROOF TAG FOR WATCHES

(71) Applicant: eBay Inc., San Jose, CA (US)

(72) Inventors: Noah Andrew Zamansky, Los Gatos, CA (US); James William Hendy, Tiburon, CA (US)

(73) Assignee: eBay Inc., San Jose, CA (US)

( * ) Notice: Subject to any disclaimer, the term of this patent is extended or adjusted under 35 U.S.C. 154(b) by 33 days.

(21) Appl. No.: 17/865,090

(22) Filed: Jul. 14, 2022

(65) Prior Publication Data

US 2022/0349216 A1 Nov. 3, 2022

Related U.S. Application Data

(63) Continuation of application No. 16/694,168, filed on Nov. 25, 2019, now Pat. No. 11,428,030, which is a (Continued)

(51) Int. Cl.
*G09F 3/00* (2006.01)
*E05B 73/00* (2006.01)
(Continued)

(52) U.S. Cl.
CPC ........ *E05B 73/0017* (2013.01); *G09F 3/0292* (2013.01); *G09F 3/03* (2013.01);
(Continued)

(58) Field of Classification Search
CPC ...... E05B 73/0017; G09F 3/0292; G09F 3/03; G09F 3/0376; G09F 3/08; G09F 3/10; G09F 3/0341; G09F 3/037; G09F 2003/0266
See application file for complete search history.

(56) References Cited

U.S. PATENT DOCUMENTS

| | | | |
|---|---|---|---|
| 3,455,043 | A | 7/1969 | Augustine |
| 3,712,049 | A | 1/1973 | Luxembourg |

(Continued)

FOREIGN PATENT DOCUMENTS

| | | | |
|---|---|---|---|
| CN | 1111071 | A | 11/1995 |
| CN | 1413337 | | 4/2003 |

(Continued)

OTHER PUBLICATIONS

"Final Office Action", U.S. Appl. No. 16/694,168, filed Mar. 21, 2022, 18 pages.

(Continued)

*Primary Examiner* — Laura C Powers
(74) *Attorney, Agent, or Firm* — FIG. 1 Patents

(57) ABSTRACT

Disclosed is a tamper proof tag and accompanying method for verifying that a watch is authentic and has not been tampered with. The tamper proof tag, when affixed to the watch, ensures that the watch is authentic and prevents a user from tampering with the watch. The tamper proof tag also allows the watch to be worn while the tamper proof tag is affixed to watch and is minimally obstructive to the aesthetics of the watch. This provides a purchasing user with confidence that the watch is authentic, while also allowing the user to try on the watch without having to remove the tamper proof tag. The tamper proof tag also protects the seller from a user that may attempt to tamper with the watch after purchase. For example, the seller may condition returns for a sold watch on the tamper proof tag remaining affixed to the watch.

20 Claims, 5 Drawing Sheets

Related U.S. Application Data continuation of application No. 16/128,981, filed on Sep. 12, 2018, now Pat. No. 10,519,697.

(51) Int. Cl.

| | |
|---|---|
| ***G09F 3/02*** | (2006.01) |
| ***G09F 3/03*** | (2006.01) |
| ***G09F 3/08*** | (2006.01) |
| ***G09F 3/10*** | (2006.01) |

(52) U.S. Cl.

CPC .............. *G09F 3/0376* (2013.01); *G09F 3/08* (2013.01); *G09F 3/10* (2013.01); *G09F 2003/0266* (2013.01)

(56) References Cited

U.S. PATENT DOCUMENTS

| | | | |
|---|---|---|---|
| 3,755,940 A | 9/1973 | Anderson | |
| 6,196,593 B1 | 3/2001 | Petrick et al. | |
| 6,276,725 B1 | 8/2001 | Laurash et al. | |
| 7,411,659 B1 * | 8/2008 | Gaetano ................. | G03B 27/58 355/126 |
| 10,519,697 B1 | 12/2019 | Zamansky et al. | |
| 2002/0091962 A1 | 7/2002 | Wunderlick | |
| 2004/0021312 A1 | 2/2004 | Dietz et al. | |
| 2005/0094497 A1 | 5/2005 | Smouha | |
| 2006/0230661 A1 | 10/2006 | Bekker | |
| 2007/0130811 A1 | 6/2007 | Shevelev | |
| 2008/0151695 A1 | 6/2008 | Kimel et al. | |
| 2008/0295378 A1 | 12/2008 | Streisfeld | |
| 2009/0007470 A1 | 1/2009 | Hill | |
| 2009/0010110 A1 | 1/2009 | Chariton | |
| 2009/0195385 A1 | 8/2009 | Huang et al. | |
| 2011/0086194 A1 | 4/2011 | Williams | |
| 2012/0062368 A1 | 3/2012 | Graells Ferrandez et al. | |
| 2012/0085828 A1 | 4/2012 | Ziegler | |
| 2012/0085829 A1 | 4/2012 | Ziegler | |
| 2014/0263659 A1 | 9/2014 | Kervinen et al. | |
| 2017/0124918 A1 | 5/2017 | Davis et al. | |
| 2017/0238665 A1 | 8/2017 | Phipps | |
| 2020/0095808 A1 | 3/2020 | Zamansky et al. | |

FOREIGN PATENT DOCUMENTS

| | | |
|---|---|---|
| CN | 101090650 | 12/2007 |
| CN | 101830107 | 9/2010 |
| CN | 101911154 A | 12/2010 |
| CN | 102436711 | 5/2012 |
| CN | 103443817 | 12/2013 |
| CN | 203885149 | 10/2014 |
| CN | 105473459 | 4/2016 |
| CN | 107209808 A | 9/2017 |
| DE | 1586539 | 6/1971 |
| DE | 9406320 | 8/1994 |
| EP | 1420477 | 5/2004 |
| EP | 1455326 | 9/2004 |
| IN | 246918 | 3/2011 |
| JP | 2005345319 | 12/2005 |
| JP | 2008003433 | 1/2008 |
| JP | 2010122544 A | 6/2010 |
| KR | 1020180006350 | 1/2018 |
| TW | 201115525 A | 5/2011 |
| WO | 9500939 A1 | 1/1995 |
| WO | WO-0148687 | 7/2001 |
| WO | WO-03107308 | 12/2003 |
| WO | WO-2010121802 | 10/2010 |
| WO | WO-2020055648 | 3/2020 |

OTHER PUBLICATIONS

"Notice of Allowance", U.S. Appl. No. 16/694,168, filed May 17, 2022, 10 pages.

10-2020-7032170, "Office Action received for Korean Patent Application No. 10-2020-7032170, mailed on Sep. 17, 2021", Sep. 17, 2021, 6 Pages.

U.S. Appl. No. 16/128,981, "Non-Final Office action received for U.S. Appl. No. 16/128,981 mailed on Apr. 4, 2019", Apr. 4, 2019, 8 Pages.

U.S. Appl. No. 16/128,981, "Notice of Allowance Received for U.S. Appl. No. 16/128,981, mailed on Aug. 28, 2019", Aug. 28, 2019, 7 Pages.

U.S. Appl. No. 16/128,981, "Response to Non-Final Office Action Filed on Aug. 8, 2019, for U.S. Appl. No. 16/128,981 mailed on Apr. 4, 2019", Aug. 8, 2019, 5 Pages.

U.S. Appl. No. 16/128,981, "Response to Restriction Requirement filed on Feb. 19, 2019, for U.S. Appl. No. 16/128,981, mailed on Nov. 21, 2018", Feb. 19, 2019, 6 Pages.

U.S. Appl. No. 16/128,981, "Restriction Requirement Received for U.S. Appl. No. 16/128,981, mailed on Nov. 21, 2018", Nov. 21, 2018, 6 Pages.

U.S. Appl. No. 16/694,168, "Corrected Notice of Allowability", U.S. Appl. No. 16/694,168, filed Jul. 26, 2022, 2 pages.

U.S. Appl. No. 16/694,168, "Non Final Office Action Received for U.S. Appl. No. 16/694,168, mailed on Dec. 22, 2021", Dec. 22, 2021, 24 Pages.

201980038285.9, "Office Action received for Chinese Patent Application No. 201980038285.9, mailed on Dec. 15, 2021", Dec. 15, 2021, 9 Pages.

201980038285.9, "Office Action received for Chinese Patent Application No. 201980038285.9, mailed on May 25, 2022", May 25, 2022, 10 pages.

PCT/US2019/049628, "International Preliminary Report on Patentability received for PCT Application No. PCT/US2019/049628, mailed on Mar. 25, 2021", Mar. 25, 2021, 9 Pages.

PCT/US2019/049628, "International Search Report received for PCT Application No. PCT/US2019/049628, mailed on Nov. 28, 2019", Nov. 28, 2019, 3 Pages.

PCT/US2019/049628, "International Written Opinion received for PCT Application No. PCT/US2019/049628, mailed on Nov. 28, 2019", Nov. 28, 2019, 7 Pages.

201980038285.9 , "Notice of Decision to Grant received for Chinese Patent Application No. 201980038285.9 mailed on Aug. 3, 2022", Aug. 3, 2022, 7 Pages.

* cited by examiner

TAMPER PROOF TAG FOR WATCHES

CLAIM OF PRIORITY

This Application is a continuation of U.S. application Ser. No. 16/694,168, filed Nov. 25, 2019, which is a continuation of U.S. application Ser. No. 16/128,981, filed Sep. 12, 2018, which are hereby incorporated by reference in their entirety.

TECHNICAL FIELD

An embodiment of the invention relates generally to search tamper proof tags and, more specifically, to tamper proof tags for watches.

BACKGROUND

The Internet provides a platform for users to easily sell and purchase items. Luxury watches are one product that is commonly sold on the Internet. This includes new luxury watches, as well as vintage luxury watches. One concern with buying and selling luxury watches online is fraud. Due to the high prices associated with luxury watches, some fraudsters will post pictures of an authentic watch and then ship a replica to a purchasing user. As another example, a fraudster may tamper with an authentic watch and replace the high end internal components with cheaper components. In either case, the buyer isn't getting what they bargained for. To guard against this type of tampering and fraud, a watch can be enclosed in a protective casing or packaging, however these types of security measures limit the potential buyer from trying on the watch properly. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
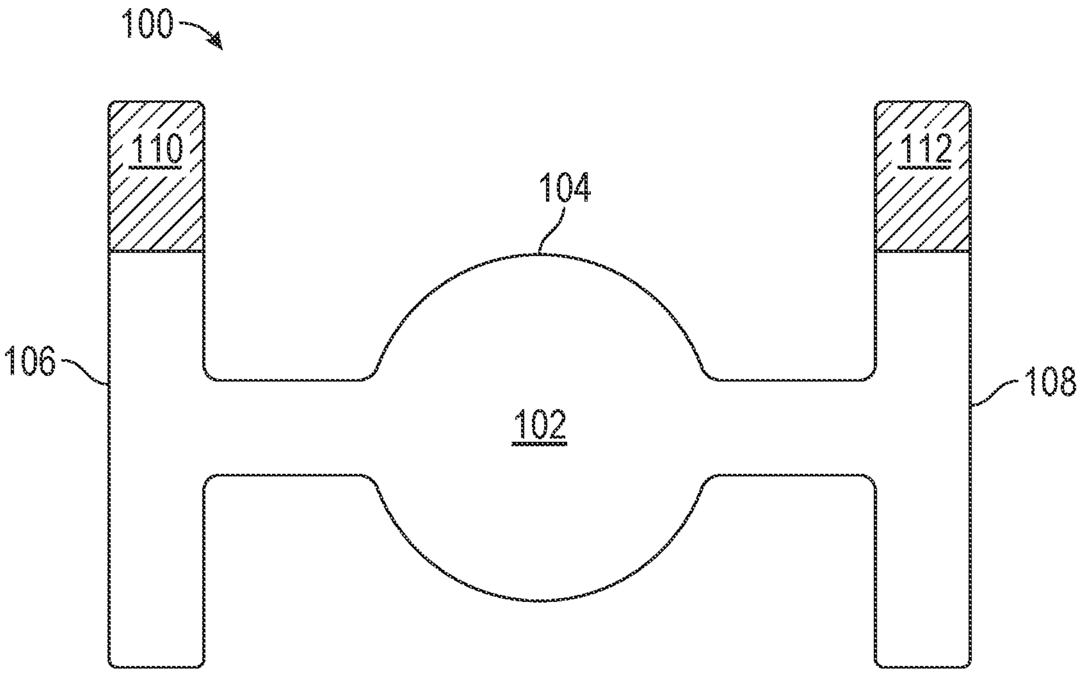
FIGS. 1A and 1B show a tamper proof tag, according to some example embodiments.

In the following description, for purposes of explanation, various details are set forth in order to provide a thorough understanding of various embodiments of the invention. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed is a tamper proof tag and accompanying method for verifying that a watch is authentic and has not been tampered with. Certain luxury watches can cost hundreds of thousands to over a million dollars. While these are extreme examples, many luxury watches cost thousands or tens of thousands of dollars. When dealing with such high value items, authenticating that the item is authentic and untampered with is of extreme importance. As explained earlier, fraudsters may attempt to send a fake watch to a buyer, or tamper with the watch by removing the high end internal components with cheaper components. While secure packaging can be used to deter this type of activity, it also limits the purchasing user from trying on the watch without removing the packaging.

To alleviate these issues, a tamper proof tag is affixed to the watch. The tamper proof tag ensures that the watch is authentic and prevents a user from tampering with the watch. The tamper proof tag allows the watch to be worn while the tamper proof tag is affixed to watch and is also minimally obstructive to the aesthetics of the watch. This provides a purchasing user with confidence that the watch is authentic, while also allowing the user to try on the watch without having to remove the tamper proof tag. This may allow the user to return the watch if so desired, for example, if the user did not like how the watch looked when it was worn. The tamper proof tag also protects the seller from a user that may attempt to tamper with the watch after purchase. For example, the seller may condition returns for a sold watch on the tamper proof tag remaining affixed to the watch.

The tamper proof tag includes a cover component and two fastening arms coupled to opposite sides of a cover component. The fastening arms are used to fasten the tamper proof tag to the strap of a watch. For example, the fastening arms are fastened to the strap of the watch on both sides of the face of the watch. Fastening the fastening arms to the watch causes the cover component of the tamper proof tag to cover the back of the face of the watch. The tamper proof tag restricts access to the back of the face of the watch, thereby limiting a user's ability to open the back of the watch and tamper with the internal components of the watch. The tamper proof tag does not cover the face of the watch, thereby allowing a purchasing user to wear the watch without having to remove the tamper proof tag.

Each of the fastening arms of the tamper proof tag include a tamper proof component that enables the fastening arm to be fastened to the strap of the watch and indicates whether the tamper proof tag has been removed or tampered with after being fastened to the watch. For example, the tamper proof component may be a tamper evident security tape that visually indicates whether any portion of the tamper proof tag has been unfastened after being fastened to the watch. The tamper proof component restricts a user's ability to remove the tamper proof tag after it has been affixed to the watch, thereby reducing the likelihood that a user will tamper with the watch.

The tamper proof tag may be affixed to a watch by a trusted entity that authenticates that the watch is authentic and has not been tampered with. For example, a watch may be initially processed by the trusted entity prior to being provided to a retailer/seller that lists the watch for sale online. As another example, a watch that is in the possession of a retailer/seller may be provided to the trusted entity for authenticated prior to being listed for sale by the retailer/seller.

Figure 1B:
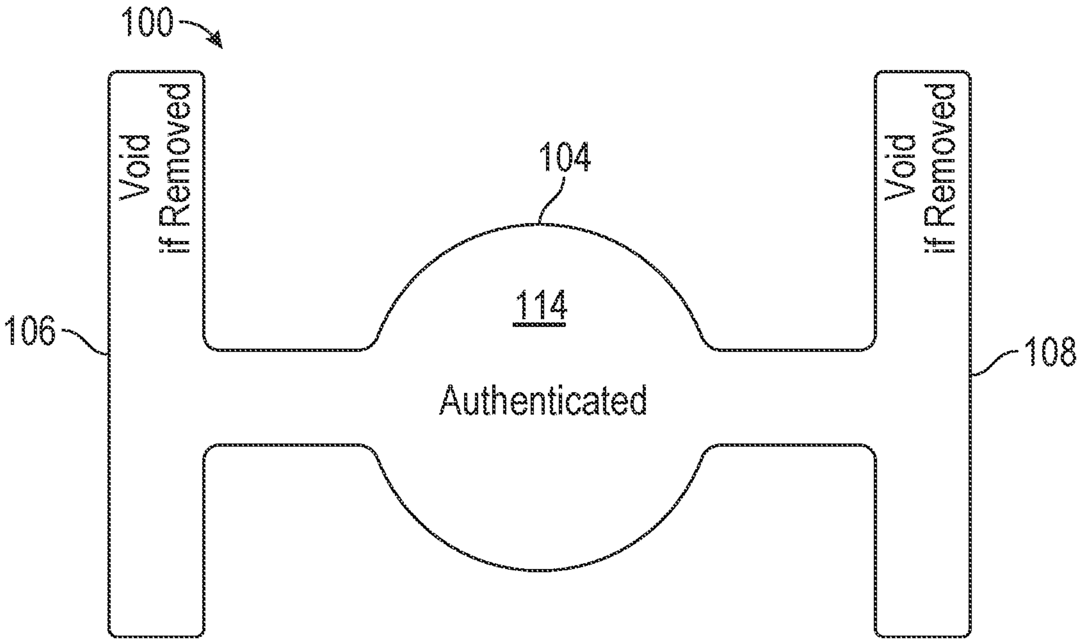

FIGS. 1A and 1B show a tamper proof tag 100, according to some example embodiments. FIG. 1A shows a first side 102 of the tamper proof tag 100. The tamper proof tag 100 includes a cover component 104 coupled to a first fastening arm 106 and a second fastening arm 108. The first fastening arm 106 and the second fastening arm 108 are used to fasten the tamper proof tag 100 to a watch. That is, the tamper proof tag 100 is made of a flexible material (e.g., plastic) that allows the first fastening arm 106 and the second fastening arm 108 to be wrapped around the strap of the watch to fasten the tamper proof tag 100 to the watch. The first fastening arm 106 includes a first tamper proof affixing component 110 that enables the first fastening arm 106 to be affixed to itself after being wrapped around the strap of a watch, thereby fastening the first fastening arm 106 to the strap of the watch. Similarly, the second fastening arm 108 includes a second tamper proof affixing component 112 that enables the second fastening arm 108 to be affixed to itself after being wrapped around the strap of a watch, thereby fastening the second fastening arm 108 to the strap of the watch.

In addition to enabling the first fastening arms 106 and the second fastening arms 108 to be fastened to the watch. the first tamper proof affixing component 110 and the second tamper proof affixing component 112 also indicate whether they have been unfastened after being fastened to the watch. That is, the first tamper proof affixing component 110 and the second tamper proof affixing component 112 are designed to visually indicate whether a user has attempted to unfasten either the first tamper proof affixing component 110 and/or the second tamper proof affixing component 112. For example, the first tamper proof affixing component 110 and the second tamper proof affixing component 112 may be a tamper evident security tape that includes an adhesive that can be used to affix ends of the first fastening arm 106 and the second fastening arm 108, but when unfastened breaks apart to leave a visual mark that the tamper evident security tape has been unfasted. The tamper evident security tape may leave at least a portion of the tamper security tape on the opposite end of the first fastening arm 106 or the second fastening arm 108, indicating that the first fastening arm 106 and the second fastening arm 108 has been unfastened after being fasted to the watch.

As another example, the first tamper proof affixing component 110 and the second tamper proof affixing component 112 may be a fastener that allows a user to affix the ends of the first fastening arm 106 and the second fastening arm 108, however does not allow the user to unfasten tamper proof tag 100 from the watch without physically destroying the tamper proof tag 100 in some way, such as by cutting or tearing a portion of the tamper proof tag 100. For example, the fastener may be a pull tight seal or plastic lock seal that do are not designed to be unfastened once properly fastened. Accordingly, a user can visually determine whether the tamper proof tag has been unfastened from the watch, indicating that the watch was potentially tampered with.

Properly fastening the tamper proof tag 100 to the watch causes the cover component 104 of the tamper proof tag 100 to cover the back of the face of the watch. That is, the cover component 104 becomes positioned over the back of the face of the watch when the first fastening arm 106 and the second fastening arm are both properly fastened to the strap of the watch on either side of the face of the watch. The cover component 104 prevents access to the back of the face of the watch, which is a common access point to the internal components of a watch. The cover component prevents access to the back of the watch, thereby preventing a user from accessing the internal components of the watch through the back of the face of the watch.

In some embodiments, the cover component 104 includes an adhesive material that allows the cover component to be affixed to the back of the watch. The adhesive material may be any type of glue, tape, etc. Further, the adhesive material may be a tamper proof material, such as a tamper proof security tape.

FIG. 1B shows a second side 114 of the tamper proof tag 100. As shown, the cover component 104 includes the word AUTHENTICATED to indicate that the tamper proof tag 100 assures that the authenticity of the watch it is fastened to has been confirmed. Further, the first fastening arm 106 and the second fastening arm 108 include the words VOID IF REMOVED to indicate that unfastening the tamper proof tag may voids the assertion that the watch is authentic.

Figure 2A:
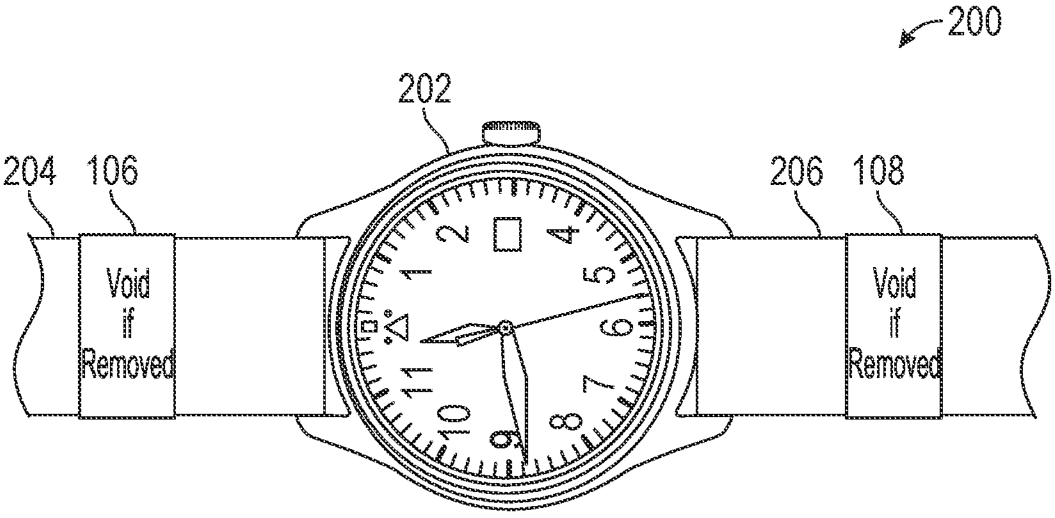
FIGS. 2A and 2B show a tamper proof tag fastened to a watch, according to some example embodiments.
Figure 2B:
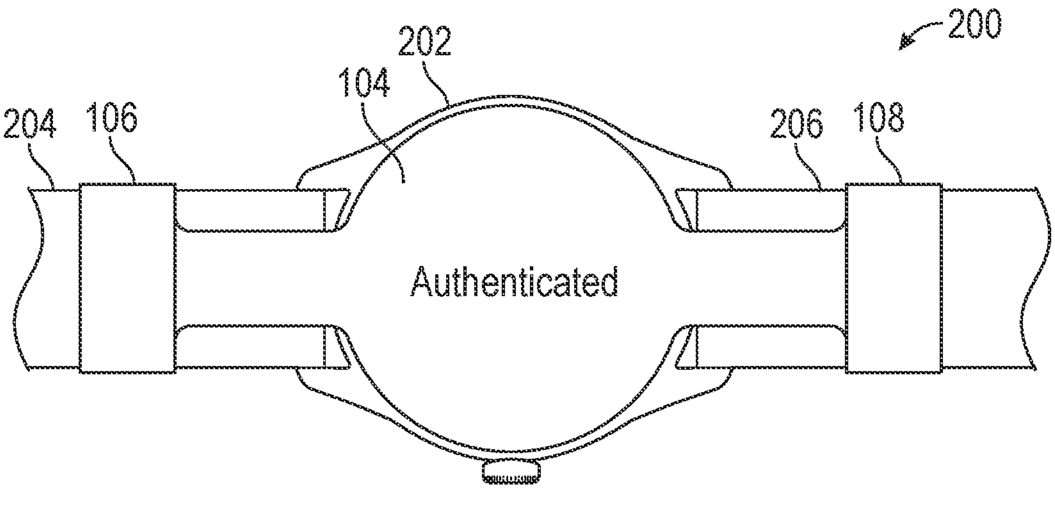

FIGS. 2A and 2B show a tamper proof tag 100 fastened to a watch 200, according to some example embodiments. FIG. 2A shows a front view of the watch 200 with the tamper proof tag 100 fastened to the watch 200. As shown, the first fastening arm 106 is fastened around a first strap 204 of the watch 200, and the second fastening arm 108 is fastened around a second strap 206 of the watch 200. The first strap 204 and the second strap 206 are positioned on opposite sides of the face 202 of the watch. The message VOID IF REMOVED is visible on both the first fastening arm 106 and the second fastening arm 108. As shown, the face 202 of the watch 200 is not obstructed by the tamper proof tag 100. This allows a user to try on the watch 200 while the tamper proof tag 100 is fastened to the watch 200 and determine how the watch will look when worn by the user.

FIG. 2B shows a back view of the face 202 of the watch 200. As shown, the cover component 104 is positioned over the back of the face 202 of the watch 200. The cover component 104 prevents a user from accessing the back of the face 202 of the watch 200, thereby limiting a user's ability to open the watch 200 to tamper with its internal components. To properly cover the entirety of the back of the face 202 of the watch 200, the size of the cover component 104 may be as large as the face 202 of the watch 200. As also shown, the words AUTHENTICATED visible on the cover component 104. This can indicate to a user that the presence of the tamper proof tag 100 on the watch 200 indicates that the watch 200 has been examined for authenticity and to ensure that the watch 200 has not been tampered with.

Although FIGS. 1A-1B and 2A-2B describe the tamper proof tag 100 being used with a watch, this is only one possible embodiment and is not meant to be limiting. The tamper proof tag 100 may be used to authenticate and prevent tampering with a variety of items. For example, the tamper proof tag 100 may be used with other wearables such as fitness trackers, smart trackers, belts, bracelets, etc. The shape of the cover component 104 of the tamper proof tag 100 may be designed to fit the back of the specific item to which the tamper proof tag will be fastened. For example, the cover component 104 may be shaped to match the back of a bracelet. In this type of embodiment, the cover component 104 of the tamper proof tag 100 would cover the back of the bracelet when fastened to the bracelet. This allow a user to wear the bracelet with minimal obstruction to the aesthetics of the bracelet, while also preventing a user from with tampering with the back of the bracelet. Similarly, the cover component 104 may be shaped to match the back of a fitness tracker. The cover component 104 of the tamper proof tag would cover the back of the fitness tracker when fastened to the fitness tracker, thereby minimizing obstruction to the aesthetics of the fitness tracker while also preventing a user from tampering with the back of the fitness tracker.

Figure 3:
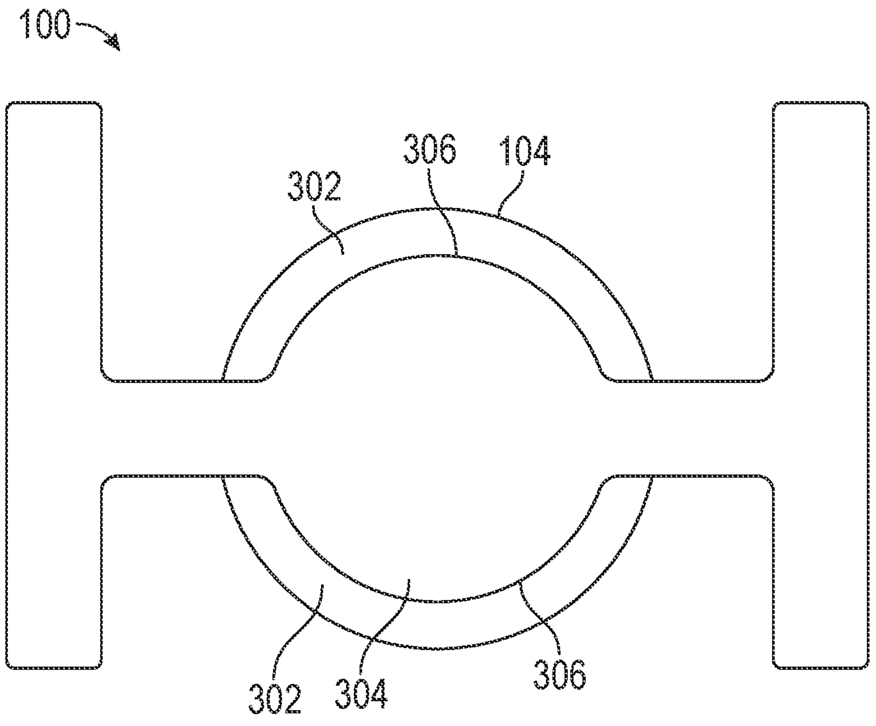
FIG. 3 shows a tamper proof tag that is adjustable in size, according to some example embodiments.

FIG. 3 shows a tamper proof tag 100 that is adjustable in size, according to some example embodiments. As shown, the cover component 104 of the tamper proof tag 100 includes an outer portion 302. The outer portion 302 is designed to be detachable from the inner portion 304 of the cover component 104. For example, the outer portion 302 may be affixed to the inner portion 304 at a seam 306, that allows the outer portion 302 to be torn away from the inner portion 304 of the cover component 104. This allows the size of the cover component 104 to be adjusted based on a size of the watch to which the tamper proof tag will be affixed. For example, the outer portion 302 may be left affixed to the cover component 104 when the tamper proof tag 100 is to be used with a watch that has a larger face, such as a Men's watch. Alternatively, the outer portion 302 may be removed when the tamper proof tag 100 is to be used with a watch that has a smaller face, such as a Women's watch.

Figure 4A:
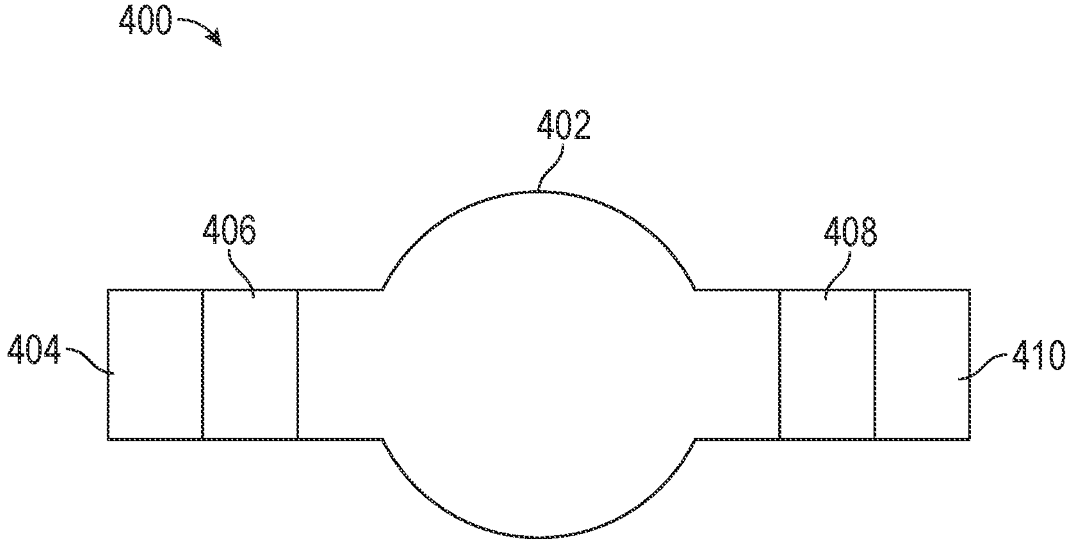
FIGS. 4A and 4B show a tamper proof tag that is adjustable in length, according to some example embodiments.
Figure 4B:
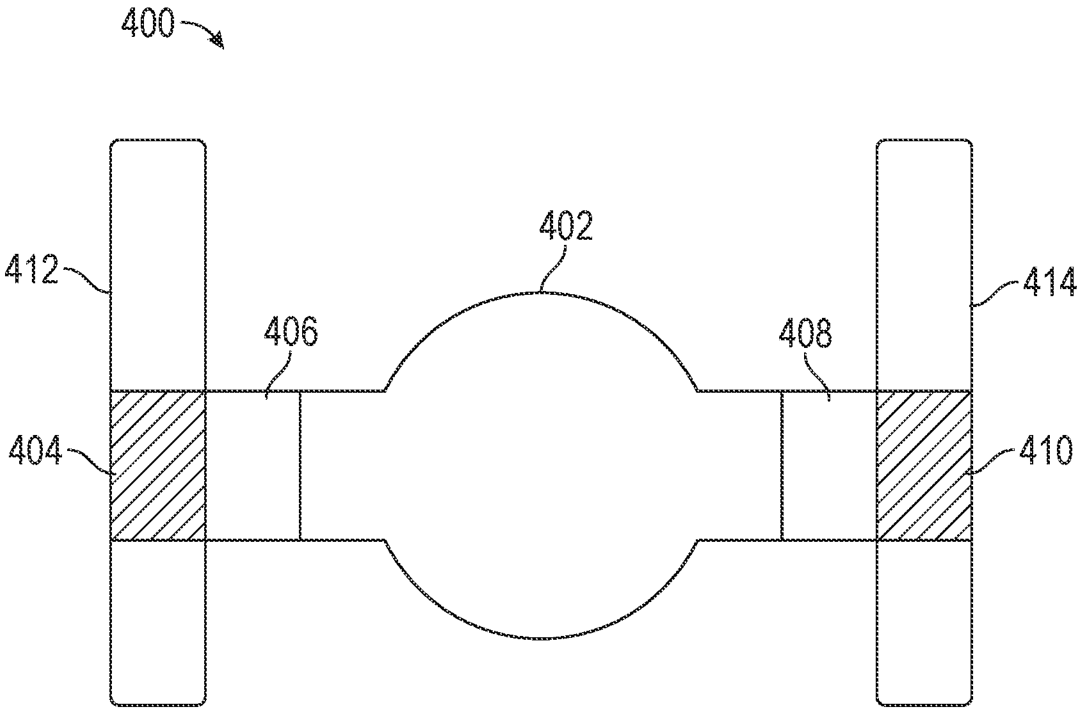

FIGS. 4A and 4B show a tamper proof tag that is adjustable in length, according to some example embodiments. To prevent a user from accessing the back of the face of the watch, it is preferable that the length between the first and second fastening arms of the tamper proof tag be similar in length to the length of the face of the watch as measured from one strap to the other. If the distance between the first and second fastening arms is much longer than the length of the face of the watch, a user may be able to access the back of the face of the watch while the tamper proof tag is fastened to the watch. Accordingly, in some embodiments, the length of the tamper proof tag is adjustable to allow a user to adjust the distance between the fastening arms based on the size of the face of the watch.

As shown in FIG. 4A, the tamper proof tag 400 includes a cover component 402 that is coupled to multiple attachment pieces 404, 406, 408, 410 on either side of the cover component 402. For example, two attachment pieces 404, 406 are coupled to one side of the cover component 402, and two other attachment pieces 408, 410 are coupled to the other side of the cover component 402. As also shown in FIG. 4A, the tamper proof tag 400 does not include fastening arms for fastening arms for fastening the tamper proof tag 400 to a watch.

The attachment pieces 404, 406, 408, 410 are designed to affix fastening arms to the tamper proof tag 400. A user may select which attachment pieces 404, 406, 408, 410 to use to affix the fastening arms to adjust the length of the tamper proof tag 400. That is, the user may select which attachment pieces 404, 406, 408, 410 to use to affix the fastening arms to adjust the length measured between the fastening arms after they have been affixed to the tamper proof tag 400. This allows a user to adjust the length based on the length of a watch to which the tamper proof tag will be affixed. For example, the user may affix the fastening arms to the outermost attachment pieces 404, 410 to create more length between the fastening arms to fit a watch with a larger face. Alternatively, the user may affix the fastening arms to the innermost attachment pieces 406, 408 to shorten more length between the fastening arms to fit a watch with a smaller face. Although only four attachment pieces 404, 406, 408, 410 are shown, this is just one example and is not meant to be limiting. the tamper proof tag may include any number of attachment pieces 404, 406, 408, 410.

Each attachment piece 404, 406, 408, 410 enables a fastening arm to be affixed to the tamper proof tag 400. The attachment pieces 404, 406, 408, 410 are preferable tamper proof to ensure that a user is not able to remove the tamper proof tag 400 after it has been fastened to a watch. For example, the attachment pieces 404, 406, 408, 410 may be a tamper proof adhesive material, plastic lock seal, pull tight seal, etc. The attachment pieces 404, 406, 408, 410 may also be loops that a fastening arm may be placed through.

FIG. 4B shows tamper proof tag 400 with fastening arms 412, 414 affixed to the tamper proof tag 400. For example, one fastening arms 412, 414 are affixed to the outermost attachment pieces 404, 410, resulting in a longer distance between the fastening arms 412, 414 than if the fastening arms 412, 414 were affixed to the innermost attachment pieces 406, 408.

Figure 5:
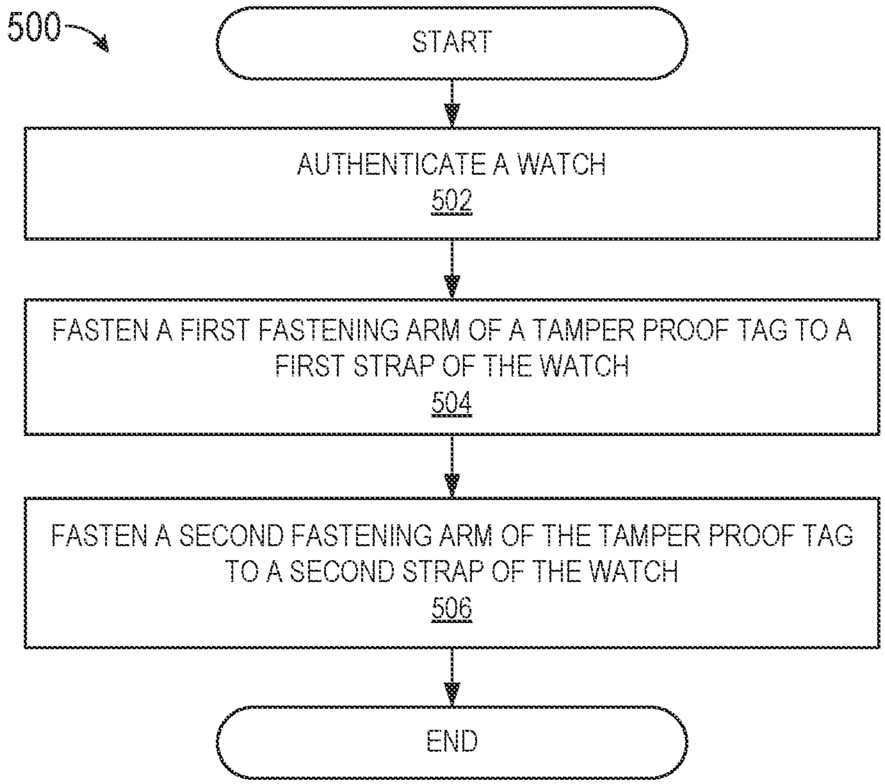
FIG. 5 is a flowchart showing an example method of using a tamper proof tag to verify that a watch is authentic and has not been tampered with, according to certain example embodiments.

FIG. 5 is a flowchart showing an example method 500 of using a tamper proof tag to verify that a watch is authentic and has not been tampered with, according to certain example embodiments.

At operation 502, a trusted entity authenticates that a watch 200 is authentic and that the watch 200 has not been tampered with. The trusted entity may be any entity (e.g., company, person, official, etc.) that is trusted to authenticate watches. For example, the trusted entity may be an online marketplace on which the watch 200 will be made available for purchase. For example, the online marketplace may require watches 200 priced over a threshold amount to be provided to employees/agents of the online marketplace to be authenticated prior to being offered for sale on the online marketplace.

In some embodiments, the trusted entity may be a machine that automates the authentication process. For example, a machine or combination of machines may include sensors that gather sensor data that may be used to authenticate the watch 200. For example, the sensor data may include images, weights, dimensions, etc., of the watch 200. The machine compares the gathered sensor data to known data about the watch 200 to determine whether the watch 200 is authentic and has not been tampered with. For example, if the gathered sensor data (e.g., weight, dimensions, images, etc.) match the known data or are within an allowable variance of the known data, the machine determines that the watch 200 is authentic and has not been tampered with. Alternatively, if the gathered sensor data does not match or is outside of the allowable variance of the know data, the machine determines that the watch 200 is not authentic or has been tampered.

In some embodiments, the machine may generate the tamper proof tag 100 for the authenticated watch 200 or other item. For example, the machine may print the tamper proof tag 100 or cause the tamper proof tag 100 to be printed. Further, the machine may use the sensor data to generate a tamper proof tag 100 that is a proper length, size, etc., for the authenticated watch 200. For example, the tamper proof tag 100 may be generated so that the length of the tamper proof tag 100 and shape of the cover component 104 are suited for the shape and the size of the watch 200. As another example, the machine may generate the length of the first fastening arms 106 and the second fastening arms 108 based on the size of the straps 204, 206 of the authenticated watch 200 so that the first fastening arms 106 and the second fastening arms 108 are long enough to be wrapped around the straps 204, 206 and secure the tamper proof tag 100 to the watch 200.

At operation 504, the trusted entity fastens a first fastening arm 106 of the tamper proof tag 100 to a first strap 204 of the watch 200. The first fastening arm 106 of the tamper proof tag 100 is fastened to the first strap 204 by wrapping the first fastening arm 106 around the first strap 204, and then using a first tamper proof affixing component 110 of the first fastening arm 106 to affix the ends of first fastening arm 106 together.

At operation 506, the trusted entity fastens a second fastening arm 108 of the tamper proof tag 100 to a second strap 206 of the watch 200. The second fastening arm 108 of the tamper proof tag 100 is fastened to the second strap 206 by wrapping the second fastening arm 108 around the second strap 206, and then using a second tamper proof affixing component 112 of the second fastening arm 108 to affix the ends of second fastening arm 108 together. Fastening the first fastening arm 106 and the second fastening arm 108 of the tamper proof tag 100 to the first and second strap 204 206 of the watch 200 cause a cover component 104 of the tamper proof tag 100 to cover a back of the face 202 of the watch. This prevents a user from being able to access the back of the face 202 of the watch 200 to access the internal components and/or otherwise tamper with the watch 200.

As explained above, in some embodiments the trusted entity may be a machine. Accordingly, the machine may be designed to fasten the first fastening arm 106 and the second fastening arm 108 to the first strap 204 and second strap 206 of the watch 200.

What is claimed is:

1. A tamper proof tag comprising:

a first fastening arm configured to fasten the tamper proof tag to a strap of a wearable item, the first fastening arm including:
- a first fastener comprising a first end and a second end, the first end and the second end configured to fasten the first fastening arm to the strap of the wearable item; and
- a first tamper proof component comprising adhesive that covers at least a portion of the first end and not the second end of the first fastener and provides a visual indication when the first end and the second end of the first fastener are not affixed to one another; and a second fastening arm for fastening the tamper proof tag to the strap of the wearable item, the second fastening arm including:
- a second fastener comprising a first end and a second end, the first end and the second end configured to fasten the second fastening arm to the strap of the wearable item; and
- a second tamper proof component comprising adhesive that covers at least a portion of the first end and not the second end of the second fastener and provides a visual indication when the first end and the second end of the second fastener are not affixed to one another.

2. The tamper proof tag of claim 1, further comprising a cover component that is coupled to the first fastening arm and the second fastening arm, the cover component covering a back side of a face of the wearable item when the first fastening arm is fastened to the strap on a first side of the face of the wearable item and the second fastening arm is fastened to the strap on a second side of the face of the wearable item.

3. The tamper proof tag of claim 2, wherein the cover component includes an outer portion that is removable to adjust a size of the cover component.

4. The tamper proof tag of claim 2, further comprising a first attachment piece affixed to the cover component and the first fastening arm, the first attachment piece including at least one portion that sets a distance between the first fastening arm and the cover component.

5. The tamper proof tag of claim 4, further comprising a second attachment piece affixed to the cover component and the second fastening arm, the second attachment piece including at least one portion that sets a distance between the second fastening arm and the cover component.

6. The tamper proof tag of claim 1, further comprising a first visual indicator that the wearable item has been authenticated by a trusted entity and a second visual indicator that an authentication by the trusted entity is voided by unfastening the tamper proof tag.

7. The tamper proof tag of claim 6, wherein the first visual indicator and the second visual indicator are visible when the first fastening arm is fastened to the strap on a first side of a face of the wearable item and the second fastening arm is fastened to the strap on a second side of the face of the wearable item.

8. A tamper proof tag comprising:

a fastening arm configured to fasten the tamper proof tag to a strap of a wearable item, the fastening arm including:
- a fastener comprising a first end and a second end, the first end and the second end configured to fasten the fastening arm to the strap of the wearable item; and
- a tamper proof component comprising adhesive that covers at least a portion of the first end and not the second end of the fastener and provides a visual indication when the first end and the second end of the fastener are not affixed to one another.

9. The tamper proof tag of claim 8, further comprising a cover component that is coupled to the fastening arm, the cover component covering a back side of a face of the wearable item when the fastening arm is fastened to the strap of the wearable item.

10. The tamper proof tag of claim 9, wherein the cover component includes an outer portion that is removable to adjust a size of the cover component.

11. The tamper proof tag of claim 9, further comprising an attachment piece affixed to the cover component and the fastening arm, the attachment piece including at least one portion that sets a distance between the fastening arm and the cover component.

12. The tamper proof tag of claim 8, further comprising a first visual indicator that the wearable item has been authenticated by a trusted entity and a second visual indicator that an authentication by the trusted entity is voided by unfastening the tamper proof tag.

13. The tamper proof tag of claim 12, wherein the first visual indicator and the second visual indicator are visible when the fastening arm is fastened to the strap.

14. A method, comprising:

fastening a first fastening arm of a tamper proof tag to a strap of a wearable item, the first fastening arm including a first tamper proof component having adhesive that covers at least a portion of a first end of the first fastening arm and not a second end of the first fastening arm, the fastening including wrapping the first fastening arm around the strap and fastening the first end of the first fastening arm to the second end of the first fastening arm using the adhesive, wherein unfastening the first end of the first fastening arm from the second end of the first fastening arm causes the first tamper proof component to provide a visual indication; and fastening a second fastening arm of the tamper proof tag to the strap of the wearable item, the first fastening arm including a second tamper proof component having adhesive that covers at least a portion of a first end of the second fastening arm and not a second end of the second fastening arm, the fastening including wrapping the second fastening arm around the strap and fastening the first end of the second fastening arm to the second end of the second fastening arm using the adhesive, wherein unfastening the first end of the second fastening arm from the second end of the second fastening arm causes the second tamper proof component to provide a visual indication.

15. The method of claim 14, wherein the tamper proof tag further includes a cover component that is coupled to the first fastening arm and the second fastening arm, and fastening the first fastening arm and the second fastening arm to the strap of the wearable item on opposite sides of a face of the wearable item causes the cover component to cover a back side of the face of the wearable item.

16. The method of claim 15, wherein the cover component includes an outer portion that is removable to adjust a size of the cover component.

17. The method of claim 15, wherein fastening the first fastening arm includes attaching the first fastening arm to one of multiple attachment pieces affixed to the cover component on a first side of the face of the wearable item, respective ones of the multiple attachment pieces being selectable to set a distance between the first fastening arm and the cover component.

18. The method of claim 17, wherein fastening the second fastening arm includes attaching the second fastening arm to one of multiple attachment pieces affixed to the cover component on a second side of the face of the wearable item, respective ones of the multiple attachment pieces being selectable to set a distance between the second fastening arm and the cover component.

19. The method of claim 14, wherein the tamper proof tag includes a first visual indicator that the wearable item has been authenticated by a trusted entity and a second visual indicator that an authentication by the trusted entity is voided by unfastening the tamper proof tag.

20. The method of claim 19, wherein the first visual indicator and the second visual indicator are visible when the first fastening arm is fastened to the strap on a first side of a face of the wearable item and the second fastening arm is fastened to the strap on a second side of the face of the wearable item.

* * * * *